United States Patent
Lee et al.

(10) Patent No.: US 10,334,174 B2
(45) Date of Patent: Jun. 25, 2019

(54) ELECTRONIC DEVICE FOR CONTROLLING A VIEWING ANGLE OF AT LEAST ONE LENS AND CONTROL METHOD THEREOF

(71) Applicant: Samsung Electronics Co., Ltd., Suwon-si, Gyeonggi-do (KR)

(72) Inventors: Dong-Woo Lee, Yongin-si (KR); Ji-Hak Kim, Incheon (KR); Soo-Kyung Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 15/649,511

(22) Filed: Jul. 13, 2017

(65) Prior Publication Data

US 2018/0048826 A1 Feb. 15, 2018

(30) Foreign Application Priority Data

Aug. 12, 2016 (KR) .......................... 10-2016-0103307

(51) Int. Cl.
| | |
|---|---|
| *H04N 5/262* | (2006.01) |
| *H04N 5/222* | (2006.01) |
| *H04N 5/232* | (2006.01) |
| *G03B 13/36* | (2006.01) |
| *H04N 5/228* | (2006.01) |

(52) U.S. Cl.
CPC ......... *H04N 5/23296* (2013.01); *G03B 13/36* (2013.01); *H04N 5/23212* (2013.01); *H04N 5/23293* (2013.01); *G09G 2340/045* (2013.01); *H04N 5/23216* (2013.01)

(58) Field of Classification Search
CPC ........... H04N 5/23216; H04N 5/23296; H04N 5/23212; A61B 1/00188; G03B 13/26; G09G 2320/068; G09G 2340/045
USPC .............................. 348/240.99, 240.1–240.3
See application file for complete search history.

(56) References Cited

U.S. PATENT DOCUMENTS

| | | | | |
|---|---|---|---|---|
| 7,110,185 B2* | 9/2006 | Saori | .................... | G02B 13/009 348/E5.042 |
| 7,215,373 B2* | 5/2007 | Sasaki | ...................... | G02B 7/28 348/333.02 |
| 7,463,292 B2* | 12/2008 | Sasaki | .................... | G02B 7/102 348/240.99 |
| 7,528,882 B2* | 5/2009 | Saori | ........................ | G02B 3/10 348/335 |
| 7,609,955 B2* | 10/2009 | Motomura | ............... | G02B 3/10 396/77 |
| 8,106,956 B2 | 1/2012 | Nikkanen et al. | | |

(Continued)

FOREIGN PATENT DOCUMENTS

| | | |
|---|---|---|
| JP | 2002182302 A | 6/2002 |
| KR | 20130139522 A | 12/2013 |

*Primary Examiner* — Ngoc Yen T Vu

(57) ABSTRACT

An electronic device may include: at least one lens; an image sensor that generates an image; and a first processor that determines a location of the at least one lens when an auto-focusing mode is executed. The electronic device also has a second processor configured to, when the location of the at least one lens is changed from a first location to a second location, change a size of a second image frame, which has a second viewing angle larger than a first viewing angle of a first image frame generated at the first location, among frames in the image, to a size corresponding to the first viewing angle.

18 Claims, 12 Drawing Sheets

(56) References Cited

U.S. PATENT DOCUMENTS

| | | | |
|---|---|---|---|
| 8,427,556 B2 * | 4/2013 | Katsumata | G03B 13/10 348/240.99 |
| 9,215,375 B2 * | 12/2015 | Shintani | H04N 5/23293 |
| 9,584,728 B2 * | 2/2017 | Baek | H04N 5/23293 |
| 2011/0254972 A1 * | 10/2011 | Yaguchi | H04N 5/23219 348/222.1 |
| 2012/0127591 A1 | 5/2012 | Okamoto et al. | |

\* cited by examiner

ELECTRONIC DEVICE FOR CONTROLLING A VIEWING ANGLE OF AT LEAST ONE LENS AND CONTROL METHOD THEREOF

CROSS-REFERENCE TO RELATED APPLICATION(S) AND CLAIM OF PRIORITY

The present application is related to and claims the priority under 35 U.S.C. § 119(a) to Korean Application Serial No. 10-2016-0103307, which was filed in the Korean Intellectual Property Office on Aug. 12, 2016, the entire content of which is hereby incorporated by reference.

TECHNICAL FIELD

Various embodiments of the present disclosure relate to an electronic device, for example, an electronic device for correcting a viewing angle, and a control method thereof.

BACKGROUND

Recently, a technology enabling an electronic device (e.g., a smart phone) to capture a picture or take a video of a subject and to store the same has been disclosed.

Using an electronic device equipped with a camera, a user may capture a picture or take a video which can provide a sense of perspective to a subject.

Meanwhile, a lens of a camera provided in an electronic device usually has an adjustable focal length, and an Auto-Focusing (AF) technology for automatically adjusting a focal length of a lens in an electronic device has been developed.

Using the auto-focusing technology, an electronic device can automatically and optimally adjust the focal length of a camera lens to align the focus with a subject a user wants to focus on among various subjects outside the camera, even without the user's manual adjustment of the focal length with respect to the subject.

SUMMARY

Conventional electronic devices employ the auto-focusing technology, which enables such electronic devices to achieve automatic focusing on a subject to be photographed by the electronic device, without user's intervention. However, for the automatic focusing, the electronic device continuously or frequently changes the viewing angle while taking a video even when the user does not want to.

As a result, the user cannot avoid viewing repetition of continuous enlargement and reduction of the viewing angle. However, there is no method for effectively controlling auto-focusing in order to solve the inconvenience caused by the change of the viewing angle.

Various embodiments of the present disclosure may provide an electronic device capable of more flexibly controlling a viewing angle which changes according to auto-focusing performed during the taking of a video.

An electronic device according to various embodiments of the present disclosure may include: at least one lens; an image sensor that generates an image; a first processor that determines a location of the at least one lens when an auto-focusing mode is executed; and a second processor configured to, when the location of the at least one lens is changed from a first location to a second location, change a size of a second image frame, which has a second viewing angle larger than a first viewing angle of a first image frame generated at the first location, among frames within the image, to a size corresponding to the first viewing angle.

A method for controlling an electronic device according to various embodiments of the present disclosure may include: executing an auto-focusing mode; determining a location of at least one lens; and when the location of the at least one lens is changed from a first location to a second location, changing a size of a second image, which has a second viewing angle larger than a first viewing angle of a first image generated at the first location, to a size corresponding to the first viewing angle.

An electronic device according to various embodiments of the present disclosure can provide a user with a viewing angle, which has been unified to be the smallest viewing angle even when the viewing angle changes frequently. Therefore, the user can take or enjoy a video in a stable condition where the viewing angle does not change and has a constant size.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
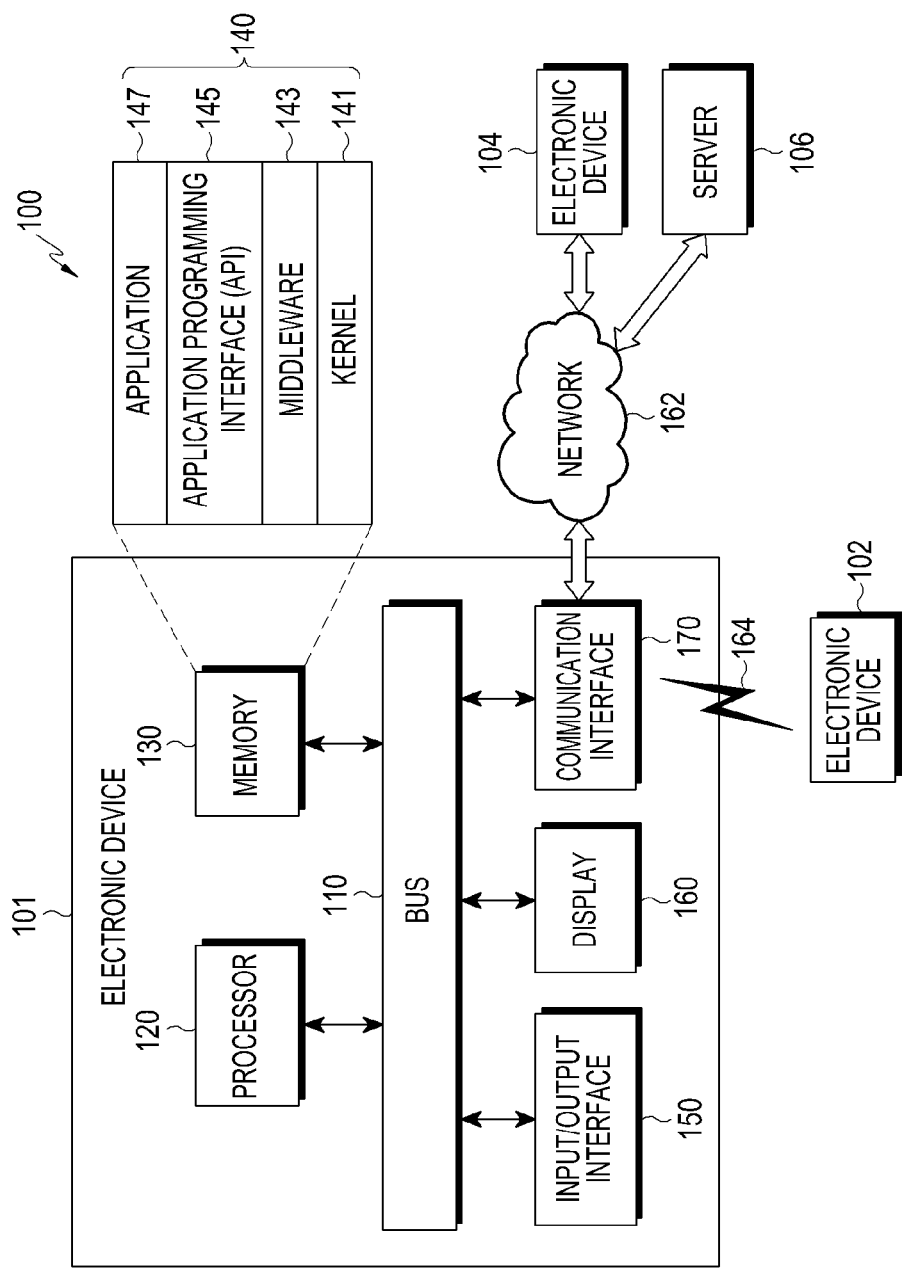
FIG. 1 is a diagram illustrating an environment where a plurality of electronic devices are used according to various embodiments of the present disclosure.

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected" or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g. Embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g, a skin pad, or tattoo), and a bio-implantable type (e.g.., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device is flexible or may be a combination of two or more of various devices described above. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 within a network environment 100 according to various embodiments will be described with reference to FIG. 1. The electronic device 101 may include a bus 110, a processor 120, a memory 130, an input/output interface 150, a display 160, and a communication circuit 170. In some embodiments, the electronic device 101 may omit at least one of the elements, or may further include other elements. The bus 110 may include a circuit for connecting elements 110 to 170 with each other and transmitting communication data (for example, control messages and/or data) between elements. The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities to at least one of the application programs 147, by which the system resources (e.g., the bus 110, the processor 120, the memory 130, etc.) of the electronic device 101 can be used, and may process the one or more task requests. The API 145 is an interface used by the application 147 to control a function provided by the kernel 141 or the middleware 143, and may include, for example, at least one interface or function (for example, an instruction) for a file control, a window control, image processing, a character control, or the like. For example, the input/output interface 150 may forward instructions or data, which is input from a user or an external device, to the other element(s) of the electronic device 101, or may output instructions or data, which is received from the other element(s) of the electronic device 101, to the user or the external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display, for example, various types of content (e.g., text, images, videos, icons, and/or symbols) for a user. The display 160 may include a touch screen and may receive, for example, a touch, gesture, proximity, or hovering input using an electronic pen or the user's body part. The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include cellular communication which uses, for example, at least one of LTE, LTE-Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. According to an embodiment, the wireless communication may include, for example, at least one of Wi-Fi, Bluetooth, Bluetooth low energy (BLE), ZigBee, near field communication (NFC), magnetic secure transmission, Radio Frequency (RF), and body area network (BAN). According to an embodiment, the wireless communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include telecommunication networks, for example, at least one of a computer network (for example, a LAN or a WAN), the Internet, and a telephone network.

Each of the first and second external electronic devices 102 and 104 may be of the same or a different type than the electronic device 101. According to various embodiments, all or some of the operations executed by the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic apparatus (for example, the electronic devices 102 and 104, or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
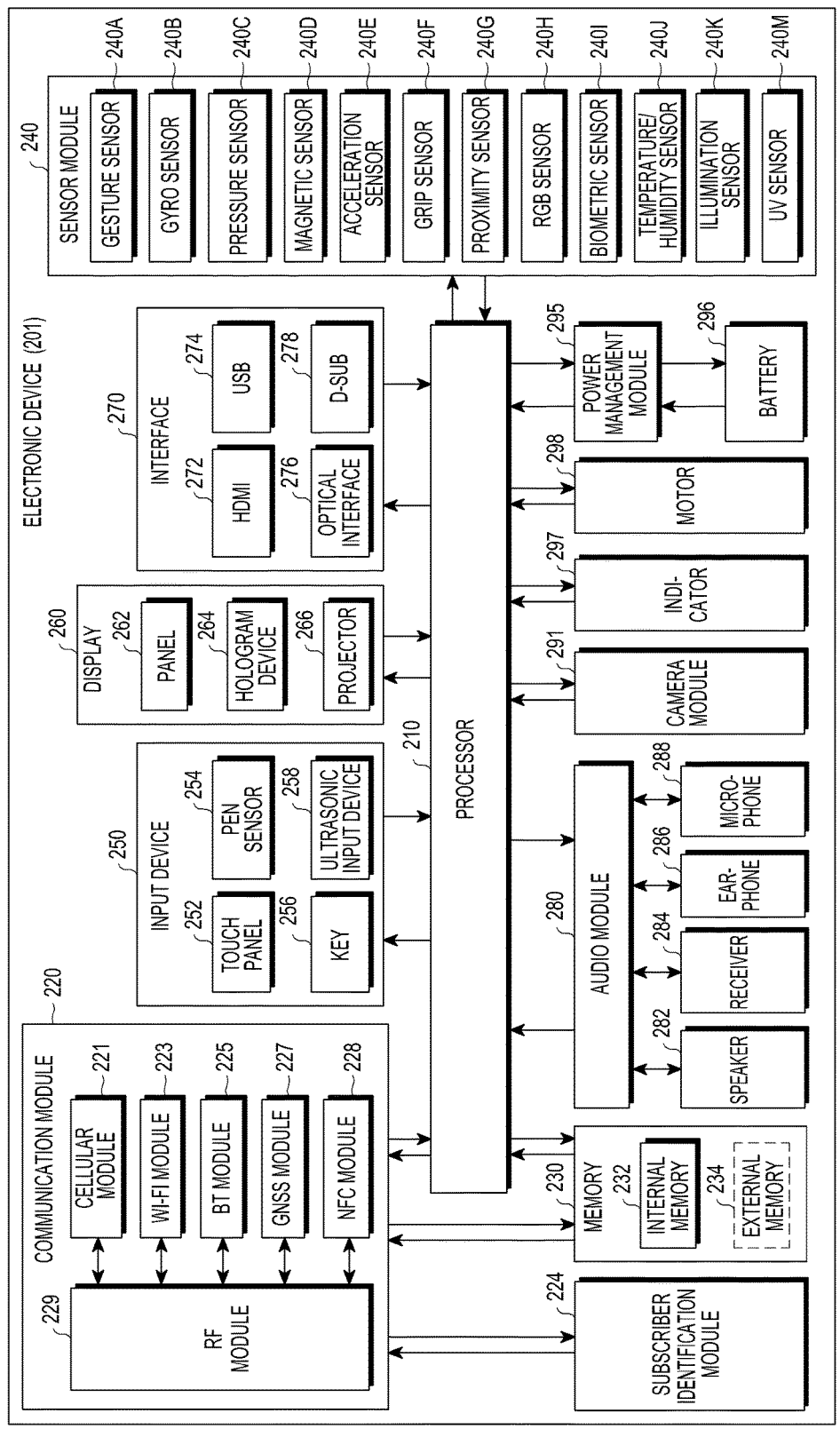
FIG. 2 is a block diagram of an electronic device according to various embodiments of the present disclosure.

FIG. 2 is a block diagram of an electronic device 201 according to various embodiments. The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (for example, a non-volatile memory), process the loaded instructions or data, and store the result data in the non-volatile memory.

The communication module 220 may have an identical or similar configuration as the communication interface (for example, the communication interface 170) shown in FIG. 1. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP). According to some embodiments, at least some (for example, two or more) of the cellular module 221, the Wi-Fi module 223, the BT module 225, the GNSS module 227, and the NFC module 228 may be included in one Integrated Chip (IC) or IC package. The RF module 229 may transmit/receive, for example, a communication signal (e.g., an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GPS module 227, and the NFC module 228 may transmit/receive an RF signal through a separate RF module. The subscriber identification module 224 may include, for example, a card or an embedded SIM including a subscriber identification module, and may include unique identification information (for example, an Integrated Circuit Card Identifier (ICCID)) or subscriber information (for example, an International Mobile Subscriber Identity (IMSI)).

The memory 230 (e.g., the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a one time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a Compact Flash (CF), Secure Digital (SD), Micro-SD, Mini-SD, eXtreme Digital (xD), a Multi-Media Card (MMC), a memory stick, and the like. The external memory 234 may be functionally or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, and Blue (RGB) sensor), a biometric sensor 240I, a temperature/humidity sensor 240J, an illumination sensor 240K, and a ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input unit 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may further include the panel 262, the hologram device 264, or the projector 266, and/or a control circuit for controlling the same. The panel 262 may be implemented to be, for example, flexible, transparent, or wearable. The panel 262, together with the touch panel 252, may be configured as one or more modules. According to an embodiment, the panel 262 may include a pressure sensor (or a POS sensor), which may measure a strength of pressure of a user's touch. The pressure sensor may be implemented with the touch panel 252 in an integrated manner, or may be implemented as one or more sensors separately from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280, for example, may convert a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. The electronic device 201 may include a mobile TV support device (for example, GPU) that can process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
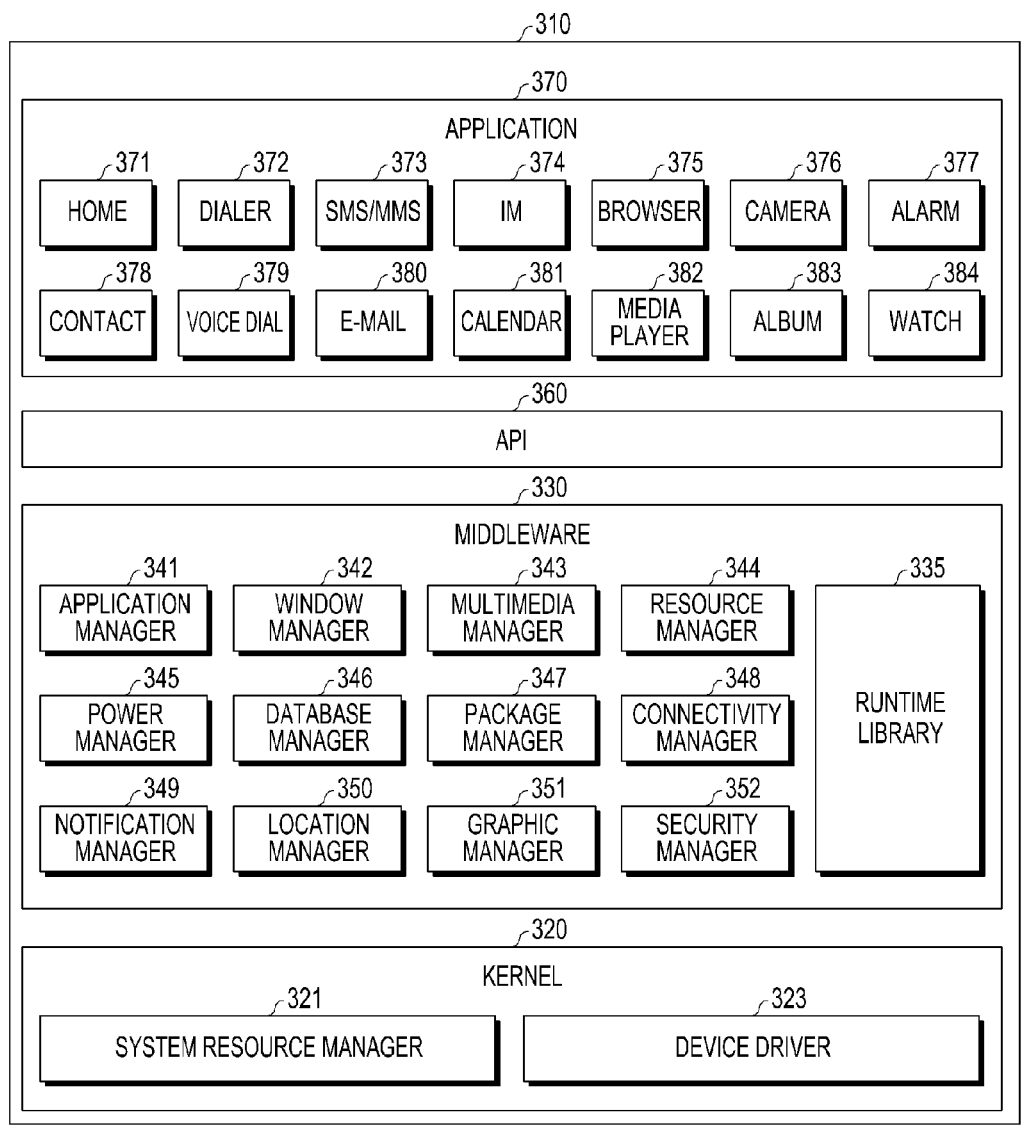
FIG. 3 is a block diagram of a program module according to various embodiments.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the application programs 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (e.g., the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing media files, and may encode or decode a media file using a codec suitable for the corresponding format. The resource manager 344 may manage the source code of the application 370 or space of the memory. The power manager 345 may manage, for example, the capacity or power of a battery, and provide power information required for the operation of an electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide a user with events, such as, for example, an arrival message, an appointment, a proximity notification, and the like. The location manager 350 may manage, for example, the location information of the electronic device. The graphic manager 351 may manage, for example, a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. Furthermore, the middleware 330 may dynamically remove some of the existing elements, or may add new elements. The API 360 is, for example, a set of API programming functions, and may be provided with different configurations according to operating systems. For example, in the case of Android or iOS, one API set may be provided for each platform, and in the case of Tizen, two or more API sets may be provided for each platform.

The applications 370 may include, for example, applications for providing a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a healthcare (e.g., measurement of the amount of exercise or blood glucose, etc.), or environmental information (e.g., atmospheric pressure, humidity, or temperature information). According to an embodiment, the applications 370 may include an information exchange application that can support the exchange of information between the electronic device and an external electronic device. An information exchange application may include, for example, a notification relay application for transmitting specific information to an external electronic device, or a device management application for managing an external electronic device. For example, a notification transmitting application may transmit notification information generated in other application of an electronic device to an external electronic device, or receive notification information from an external electronic device and provide the notification information to a user. The device management application may install, delete, or update, for example, a function (e.g., turning-on/turning-off of an external electronic device itself (or some components) or adjusting the brightness (or resolution) of the display, or an application that operates on an external electronic device. According to an embodiment, the applications 370 may include applications (e.g., a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof and may include a module, a program, a routine, an instruction set, or a process for performing one or more functions.

The term "module" as used herein may include a unit consisting of hardware, software, or firmware, and may, for example, be used interchangeably with the term "logic", "logical block", "component", "circuit", or the like. The "module" may be a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 4:
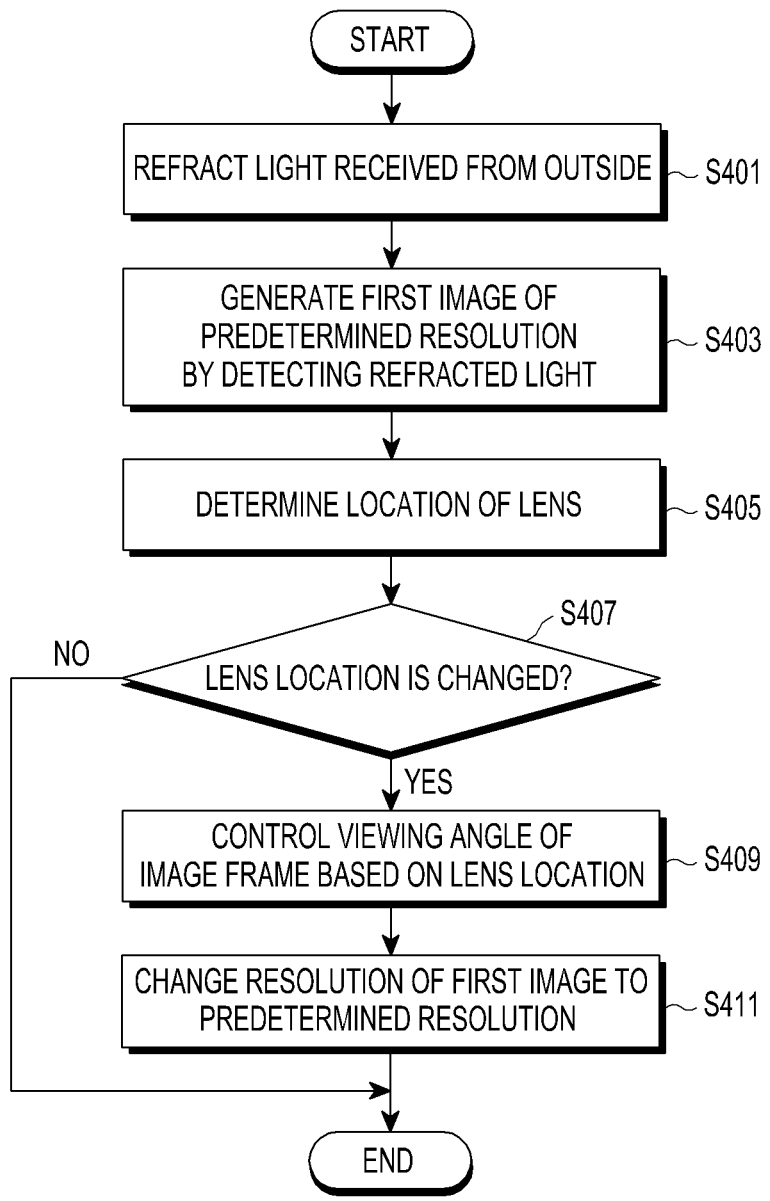
FIG. 4 illustrates a method for controlling an electronic device according to various embodiments.

FIG. 4 illustrates a method for controlling an electronic device according to various embodiments.

According to various embodiments, in operation S401, at least one lens of a camera module (e.g., the camera module 291) may refract light received from the outside.

For example, at least one lens may include one or more of a standard lens, a telescopic lens, and/or a fish-eye lens. For example, said at least one lens may be a prime lens including one lens. Otherwise, said at least one lens may be a magnifying lens including two or more lenses that can change the magnification of the lens without changing a focal length.

According to various embodiments, in operation S403, an image sensor of the camera module 291 may detect light refracted by at least one lens to generate a first image having a predetermined resolution. For example, the resolution may be determined in advance by a user or a manufacturer.

According to various embodiments, in operation S405, a lens controller may determine a location of at least one lens.

According to various embodiments, in operation S407, the lens controller may determine whether the location of at least one lens is changed. For example, the lens controller may determine whether the focal length of at least one lens is changed. For example, when a video is photographed by the camera module 291, the lens controller may control a focus of at least one lens. For example, the lens controller may control the focal length of at least one lens, and align the focus on a subject desired by a user. For example, the lens controller may determine whether a viewing angle of each frame in a first image is changed according to the location change of at least one lens. For example, when the location of at least one lens is changed, the viewing angle of an image frame may be changed. For example, when the focal length of at least one lens decreases, the viewing angle of the image frame may be enlarged. For example, when the focal length of at least one lens increases, the viewing angle of the image frame may be reduced.

According to various embodiments, in operation S409, when the location of a lens is changed, an image processor of the camera module 291 may control the viewing angle of the image frame based on the changed location of at least one lens.

For example, a viewing angle corresponding to each image frame may continue changing, for example, may be repeatedly be enlarged and reduced without converging to a specific size, according to the passage of time. In this case, the image processor may adjust a viewing angle of each remaining image frame based on the smallest viewing angle among the image frames. For example, when the second image frame from among the first to fifth image frames has the smallest viewing angle, the image processor may reduce viewing angles of the first frame, and the third frame to the fifth frame to the viewing angle of the second frame. That is, the image processor may reduce the viewing angle of each remaining image frame based on a viewing angle of a frame having the longest focal length.

More specifically, the image processor may remove a partial area of a second image frame so as to reduce the second viewing angle of the second image frame, which is larger than the first viewing angle of the first image frame (the smallest viewing angle among the viewing angles of the image frames), to the first viewing angle. In this case, the image processor may reduce the second viewing angle of the second image frame, based on the lens location corresponding to the second image frame and the lens location corresponding to the first image frame. For example, the image processor may perform a cropping operation to remove a partial area of the second image frame.

According to various embodiments, in operation S411, the image processor of the camera module 291 may reduce (downsize) a resolution of the first image including the second image frame, from which the partial area has been removed, to a predetermined resolution.

Figure 5:
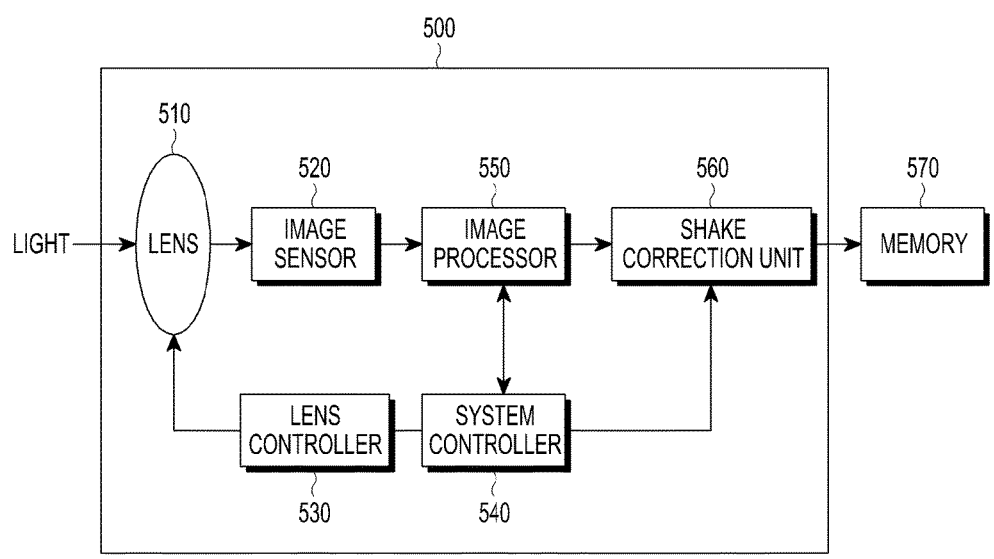
FIG. 5 illustrates a camera module of an electronic device according to various embodiments.

FIG. 5 illustrates a camera module of an electronic device according to various embodiments.

As shown in FIG. 5, according to various embodiments, a camera module (e.g., camera module 500) may include a lens 510 that receives light.

According to various embodiments, the camera module 500 may include an image sensor 520 that generates a first image using the received light.

According to various embodiments, the camera module 500 may include a lens controller 530 that performs operations for driving the lens 510, including an operation of changing the location of the lens 510.

According to various embodiments, the camera module 500 may include a system controller 540 that receives information on the focal length of the lens 510 from the lens controller 530 and generates a predetermined viewing angle correction coefficient corresponding to the focal length.

According to various embodiments, the camera module 500 may include an image processor 550 that performs image processing of a first image, using the viewing angle correction coefficient generated by the system controller 540.

According to various embodiments, the camera module 500 may include a shake correction unit 560 that performs shake correction for the first image processed by the image processor 550, using the viewing angle correction coefficient generated by the system controller 540.

According to various embodiments, the camera module 500 may include a memory 570 that stores the first image for which the shake correction has been performed.

Figure 6:
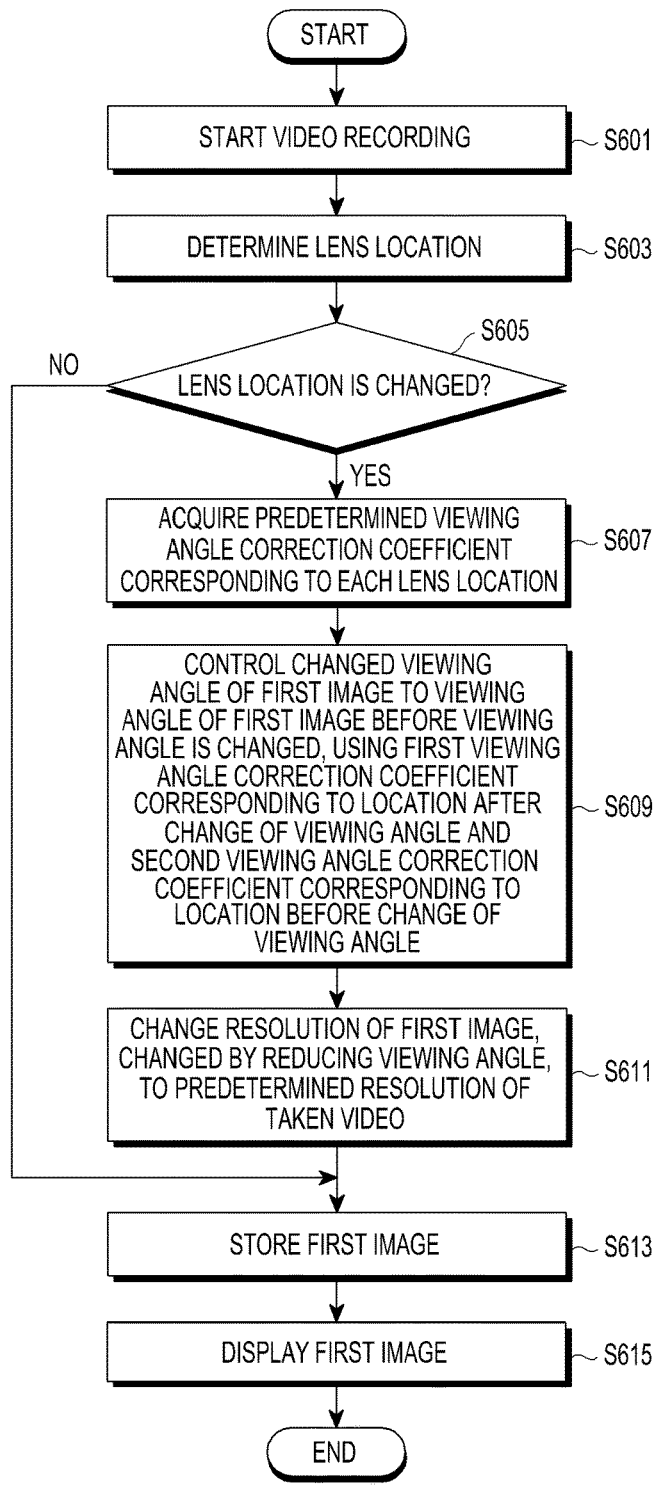
FIG. 6 illustrates a method for controlling an electronic device according to various embodiments.

FIG. 6 illustrates a method for controlling an electronic device according to various embodiments.

As shown in FIG. 6, according to various embodiments, in operation S601, a camera module (e.g., the camera module 500) may start video recording of an external subject.

According to various embodiments, in operation S603, a lens controller (e.g., the lens controller 530) may determine the location of at least one lens (e.g., the lens 510).

According to various embodiments, in operation S605, the lens controller 530 may determine whether the location of at least one lens is changed.

According to various embodiments, in operation S607, the image processor (e.g., the image processor 550) may acquire a predetermined viewing angle correction coefficient, which is generated by the system controller (e.g., the system controller 540) and corresponds to each lens location. For example, the viewing angle correction coefficient may include information on a change rate for enlarging and/or reducing a first viewing angle of a first image frame_corresponding to a first location of each lens.

According to various embodiments, in operation S609, the image processor 550 may control a viewing angle of a second image frame from a second viewing angle to a first viewing angle, using a second viewing angle correction coefficient corresponding to a second location, which is a location of the lens 510 after the viewing angle is changed, and a first viewing angle correction coefficient corresponding to a first location, which is a location of the lens 510 before the viewing angle is changed.

For example, the first viewing angle may refer to the smallest viewing angle of an image frame generated at the time of video recording.

For example, the image processor 550 may perform a cropping operation of removing a partial area of the second image frame to change the second viewing angle of the second image frame to the smallest first viewing angle, using a second viewing angle correction coefficient corresponding to a second location, which is a location of the lens 510 after the viewing angle is changed, and a first viewing angle correction coefficient corresponding to a first location, which is a location of the lens 510 corresponding to the first viewing angle, which is the smallest viewing angle among viewing angles corresponding to frames of an image.

According to various embodiments, in operation S611, the image processor 550 may reduce (downsize) a resolution of a first image including the second image frame to a predetermined resolution of a taken video.

According to various embodiments, in operation S613, when the resolution of the first image is changed to a predetermined resolution of a taken video or when the location of the lens is not changed, the image processor 550 may store the first image.

According to various embodiments, in operation S615, the image processor 550 may display the first image on a display (e.g., the display 160).

Figure 7A:
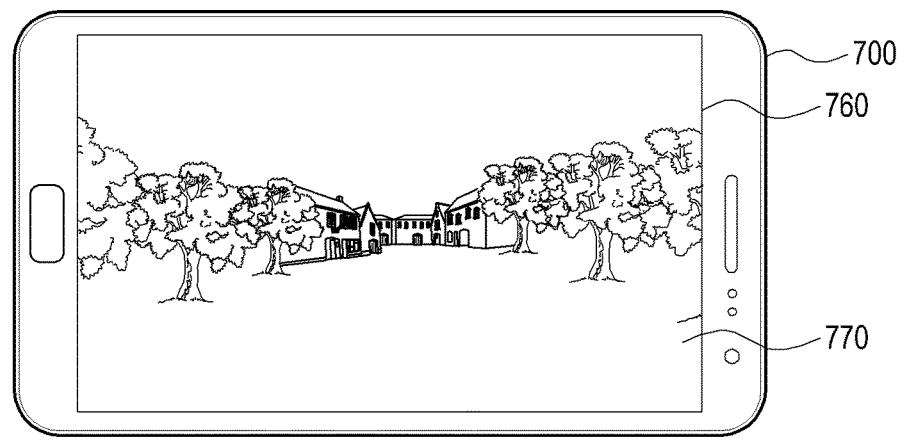
FIGS. 7A and 7B illustrate a first image according to various embodiments.
Figure 7B:
Figure 7B:
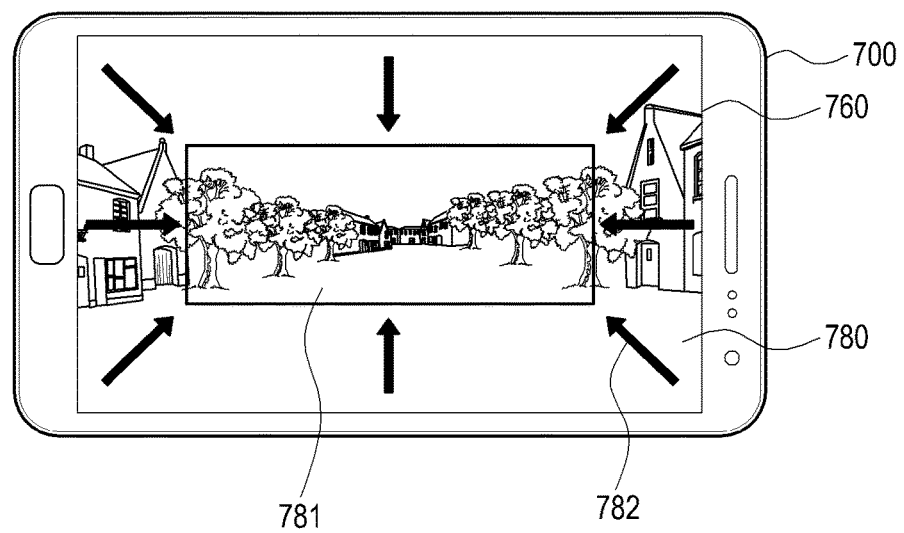

FIGS. 7A and 7B illustrate an image according to various embodiments.

An electronic device 700 may display a first image frame 770 through a display 760.

For example, the first image frame 770 shown in FIG. 7A may be the first image frame 770 which has the smallest viewing angle.

According to various embodiments, a viewing angle of the first image frame 770 may change to that of a second image frame 780 shown in FIG. 7B. For example, as the location (focal length) of at least one lens (e.g., the lens 510) is changed (reduced), the viewing angle of the first image frame 770 may be changed (enlarged) to that of the second image frame 780.

For example, as the first viewing angle of the first image frame 770 is enlarged to the second viewing angle of the second image frame 780, subjects included in the first image frame 770 before the viewing angle is enlarged may be included in a small area 781 of the second image frame 780 after the viewing angle is enlarged, and subjects not included in the first image frame 770 before the viewing angle is enlarged may be displayed in a large area 782 of the second image frame 780 after the viewing angle is enlarged.

Figure 8A:
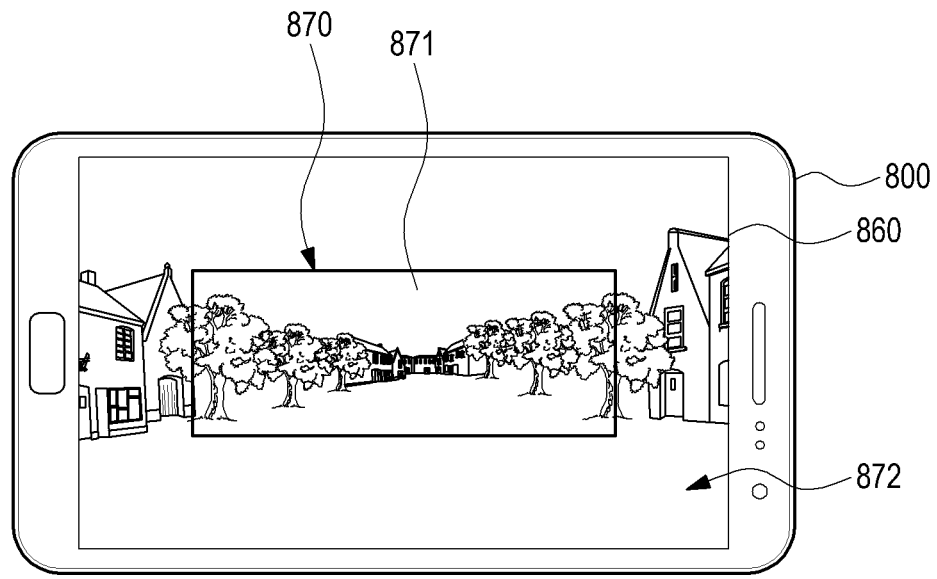
FIGS. 8A and 8B illustrate a first image according to various embodiments.
Figure 8B:
Figure 8B:
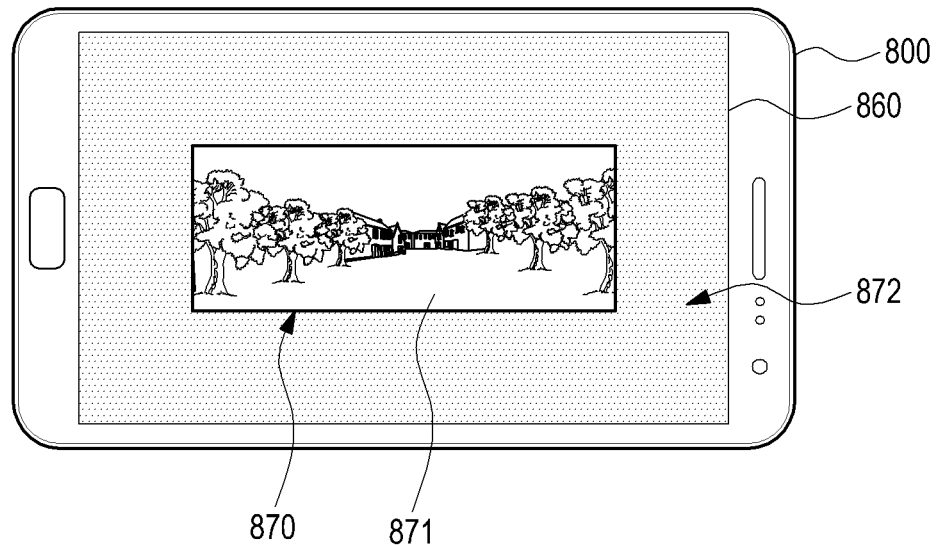

FIGS. 8A and 8B illustrate an image according to various embodiments.

The electronic device 800 may remove (perform cropping) the remaining large area 872, other than the small area 871, from the second image frame 870, of which the viewing angle displayed through the display 860 has been enlarged from the first viewing angle to the second viewing angle.

For example, the electronic device 800 may perform cropping, so as to control (reduce) the second viewing angle of the second image frame 870 to the first viewing angle, which is the same as that of the first image frame (e.g., the first image frame 770 in FIG. 7A) and is the smallest viewing angle.

Figure 9A:
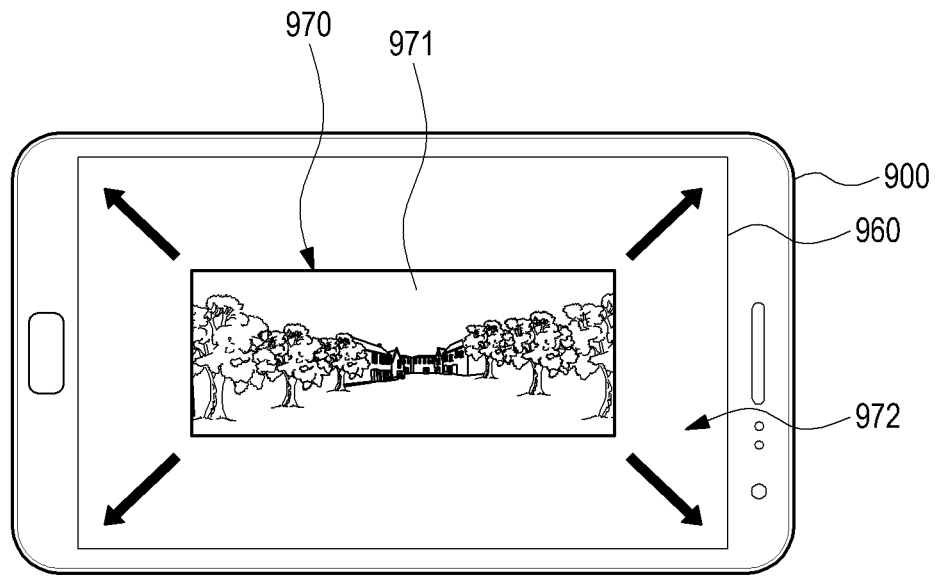
FIGS. 9A and 9B illustrate a first image according to various embodiments.
Figure 9B:
Figure 9B:
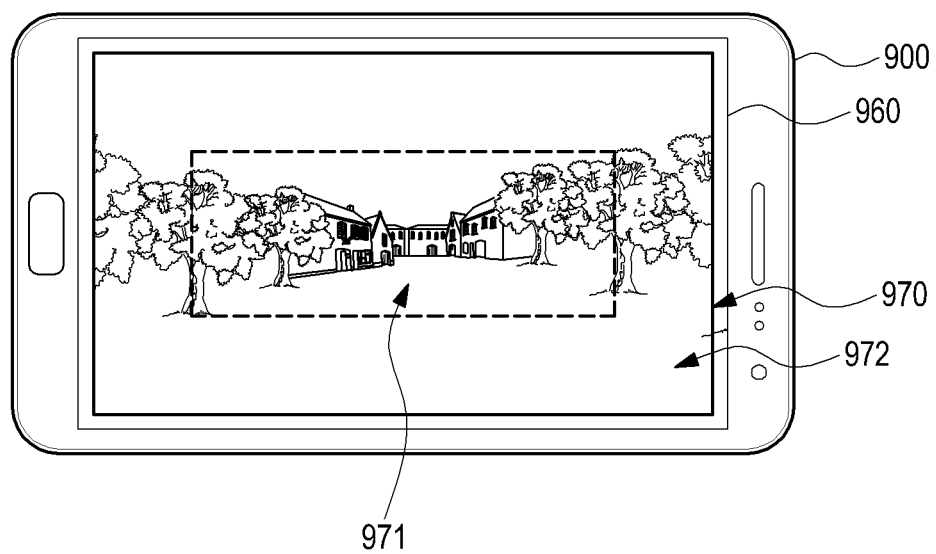

FIGS. 9A and 9B illustrate an image according to various embodiments.

An image sensor employs the lowest resolution among available resolutions in taking an image or a video. Therefore, a second image 970 having a reduced viewing angle has a larger resolution than a predetermined resolution of a taken video.

According to various embodiments, an electronic device 900 applies downsizing to the second image 970 displayed through a display 960, and can reduce the resolution of the second image 970 including only the small area, from which the large area 972 has been removed, to the predetermined resolution of the taken video.

Figure 10:
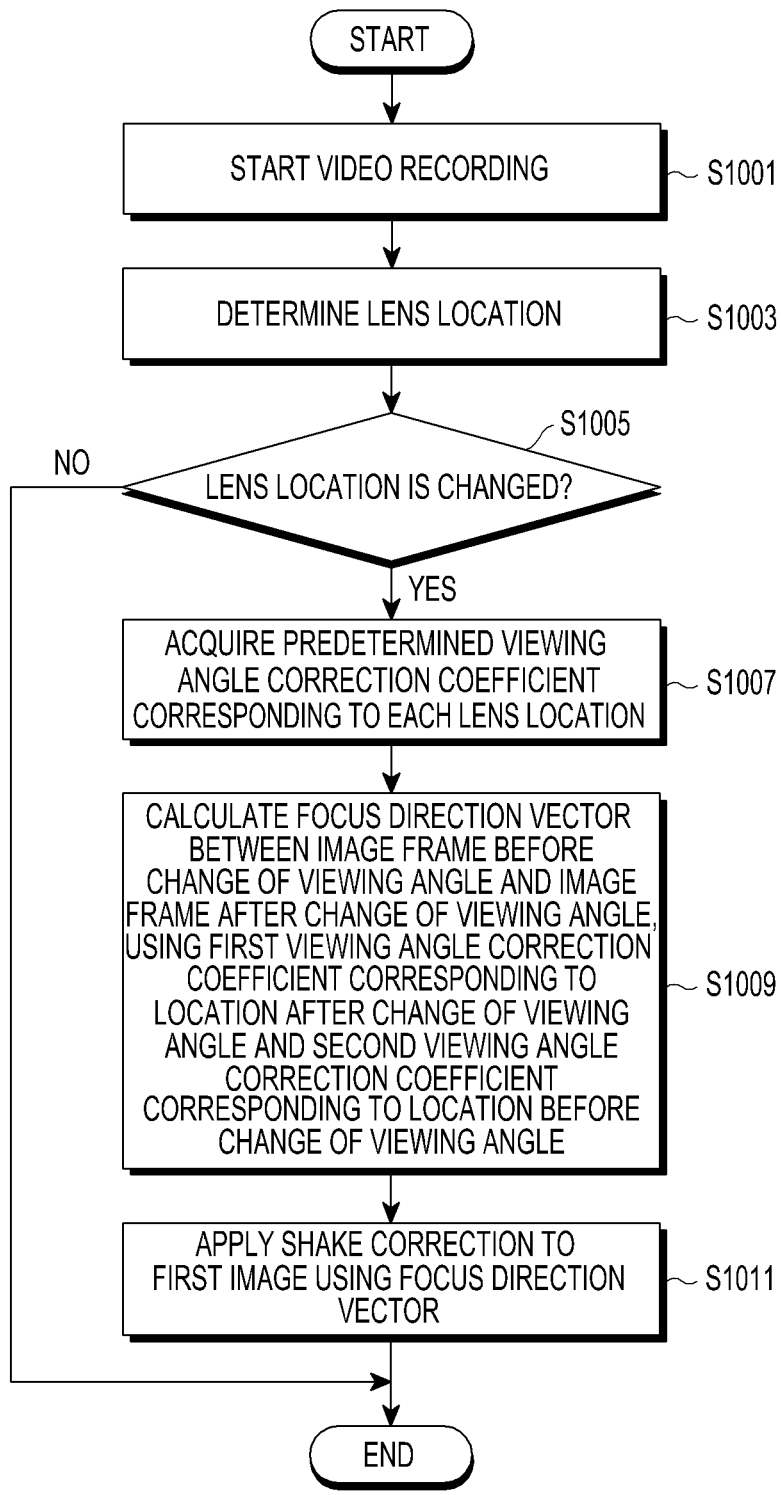
FIG. 10 illustrates a method for controlling an electronic device according to various embodiments.

FIG. 10 illustrates a method for controlling an electronic device according to various embodiments.

As shown in FIG. 10, according to various embodiments, in operation S1001, a camera module (e.g., the camera module 500) may start video recording of an external subject.

According to various embodiments, in operation S1003, the camera module 500 may determine the location of at least one lens (e.g., the lens 510).

According to various embodiments, in operation S1005, the camera module 500 may determine whether the location of at least one lens 510 is changed.

According to various embodiments, in operation S1007, when the location of the at least one lens 510 changes during the video recording, the camera module 500 may acquire a first location, which is a location before the lens location is changed, and a second location, which is a location after the lens location is changed.

According to various embodiments, in operation S1009, using the second location, which is a location of the lens after the viewing angle is changed, and the first location, which is a location before the viewing angle is changed, the camera module 500 may calculate a focus direction vector, which contains information on the variance between the first image frame before the change of the viewing angle and the second image frame after the change of the viewing angle.

For example, the focus direction vector may be defined as a vector oriented in the z-axis direction in the (x, y, z) coordinate space.

For example, the camera module 500 may calculate, as locations on the z-axis, the first location of the first image frame and the second location of the second image frame, and calculate the variance (amount of change) in the locations on the z-axis, using a focus direction vector.

According to various embodiments, in operation S1011, using a focus direction vector, the camera module 500 may apply a shake correction to the second image frame, the viewing angle of which has been changed.

For example, the camera module 500 may apply the shake correction to the second image frame, using a focus direction vector, so as to change a changed viewing angle of a frame to a viewing angle of the frame before the viewing angle is changed.

Figure 11A:
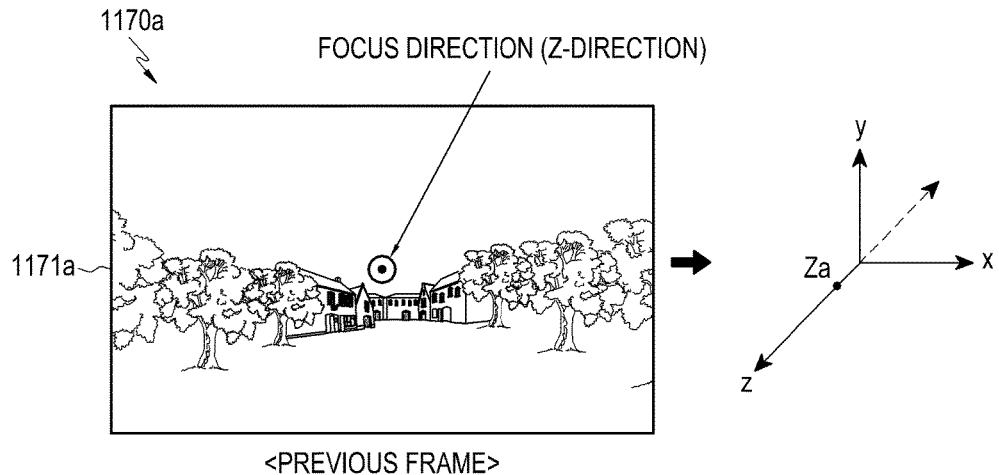
FIGS. 11A and 11B illustrate a shake correction applying operation according to various embodiments.
Figure 11B:
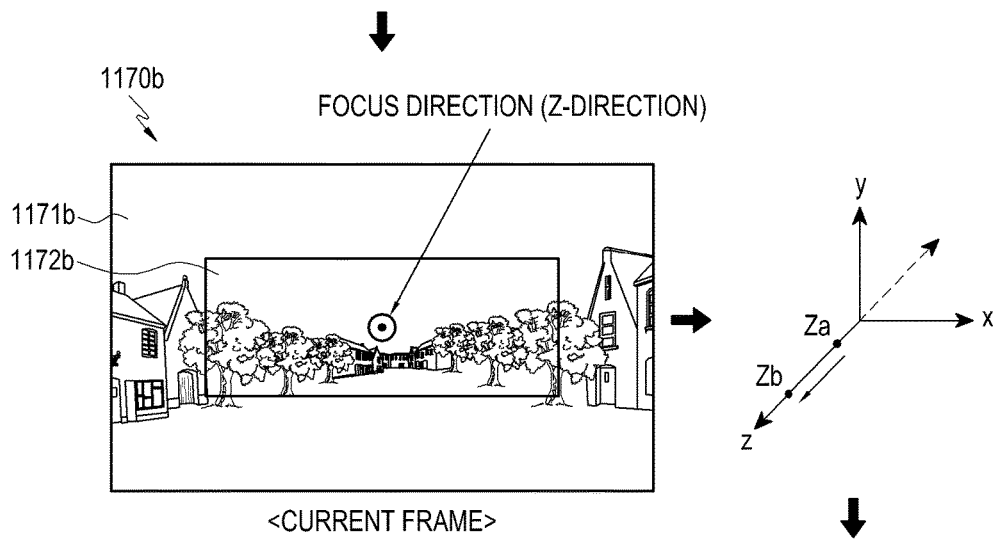

FIGS. 11A and 11B illustrate a shake correction applying operation according to various embodiments.

The camera module 500 may convert, into a motion vector (z=(0, 0, $Z_b-Z_a$) in the z-axis direction (focus direction), a predetermined first viewing angle correction coefficient corresponding to a lens location of a previous frame 1170a, and a predetermined second viewing angle correction coefficient corresponding to a lens location of a current frame 1170b.

Figure 12A:
FIGS. 12A and 12B illustrate a shake correction operation according to various embodiments.
Figure 12B:
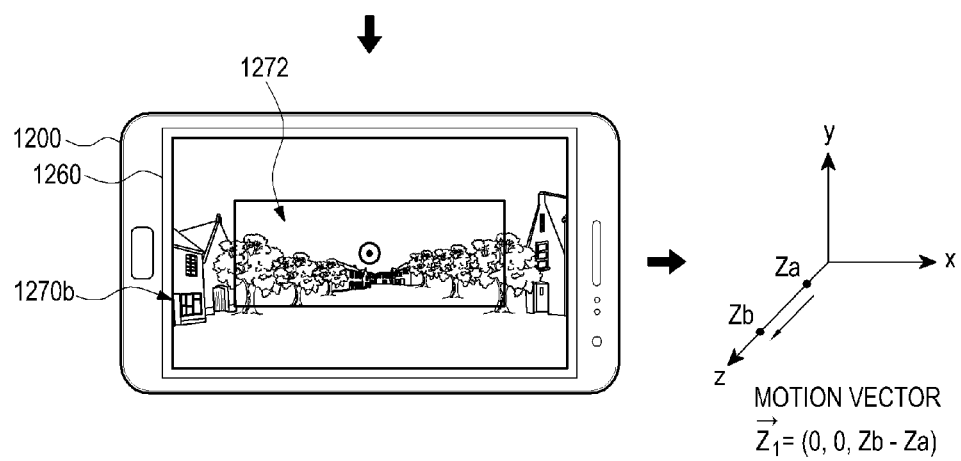

FIGS. 12A and 12B illustrate a shake correction operation according to various embodiments.

When a viewing angle of a first image frame 1270a, which is the smallest viewing angle, is enlarged to that of a second image frame 1270b, a shake correction unit (e.g., the shake correction unit 560) of an electronic device 1200 may calculate a motion vector (focus direction vector) ($z_1=(0, 0, Z_b-Z_a)$) oriented in the z-axis direction, that is, in the direction progressing out of the ground, using a first location of the first image frame 1270a before the change of the viewing angle and a second location of the second image frame 1270b after the change of the viewing angle.

According to various embodiments, the shake correction unit 560 may further apply the obtained motion vector (a focus direction vector) in the z-axis direction to the shake correction, in order to reduce the second image frame 1270b after the change of the viewing angle to the first image frame 1270a before the change of the viewing angle.

An electronic device according to various embodiments of the present disclosure may include: at least one lens; an image sensor that generates an image; a first processor that determines a location of the at least one lens when an auto-focusing mode is executed; and a second processor configured to, when the location of the at least one lens is changed from a first location to a second location, change a size of a second image frame, which has a second viewing angle larger than a first viewing angle of a first image frame generated at the first location to a size corresponding to the first viewing angle.

According to various embodiments, the second processor may acquire a predetermined correction coefficient corresponding to each location of the at least one lens, and change the size of the second image frame based on the predetermined correction coefficient.

According to various embodiments, the electronic device may further include a third processor, and the third processor may acquire the location of the at least one lens from the first processor, and generate the correction coefficient using each location of the lens corresponding to a viewing angle of the image which is generated by the image sensor, and transmit the generated correction coefficient to the second processor.

According to various embodiments, the electronic device may further include a third processor, and the third processor may acquire the location of the at least one lens from the first processor, and generate the predetermined correction coefficient using the acquired location of the at least one lens, and transmits the predetermined generated correction coefficient to the second processor.

According to various embodiments, the second processor may change the size of the second image to constantly maintain the second viewing angle at the first viewing angle.

According to various embodiments, the first location may correspond to the location of the at least one lens when the at least one lens is spaced from the image sensor by a predetermined threshold distance.

According to various embodiments, the second processor may calculate a focus direction vector using the first viewing angle and the second viewing angle, and change the size of the second image based on the calculated focus direction vector.

According to various embodiments, the second processor may apply a shake correction to the second image based on the focus direction vector.

According to various embodiments, the electronic device may further include a display, and the second processor may display the image on the display in a state where a change in viewing angles between the first and second images has been removed.

According to various embodiments, the electronic device may further include a display, and the second processor displays the image on the display while maintaining, as the first viewing angle, the viewing angle of the first image, which has the first viewing angle, and the viewing angle of the second image, the size of which has been changed to the size corresponding to the first viewing angle.

According to various embodiments, the second processor may downsize resolutions of the first image and the second image to a resolution of the image sensor.

A method for controlling an electronic device according to various embodiments of the present disclosure may include: executing an auto-focusing mode; determining a location of at least one lens; and when the location of the at least one lens is changed from a first location to a second location, changing a size of a second image, which has a second viewing angle larger than a first viewing angle of a first image generated at the first location, to a size corresponding to the first viewing angle.

According to various embodiments, the method may further include: acquiring a predetermined correction coefficient corresponding to each location of the at least one lens; and changing the size of the second image based on the predetermined correction coefficient.

According to various embodiments, the method may further include: acquiring a location of the at least one lens; and generating the correction coefficient using each location of the lens corresponding to the viewing angle of an image generated by the image sensor.

According to various embodiments, the method may further include: acquiring a location of the at least one lens; and generating the predetermined correction coefficient using the acquired location of the at least one lens.

According to various embodiments, the method may further include changing the size of the second image to constantly maintain the second viewing angle at the first viewing angle.

According to various embodiments, the first location may correspond to a location of the at least one lens when the at least one lens is spaced from the image sensor by a predetermined threshold distance.

According to various embodiments, the method may further include: calculating a focus direction vector using the first viewing angle and the second viewing angle; and changing the size of the second image based on the calculated focus direction vector.

According to various embodiments, the method may further include applying a shake correction to the second image based on the focus direction vector.

According to various embodiments, the method may further include displaying the image in a state where a change in viewing angles between the first and second images has been removed.

According to various embodiments, the method may further include displaying the image while maintaining, as the first viewing angle, the viewing angle of the first image, which has the first viewing angle, and the viewing angle of the second image, the size of which has been changed to the size corresponding to the first viewing angle.

According to various embodiments, the method may further include downsizing resolutions of the first image and second image to a resolution of the image sensor.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   at least one lens;
   an image sensor; and
   at least one processor configured to:
     execute an auto-focusing mode,
     in response to executing of the auto-focusing mode, identify a location of the at least one lens,
     when the location of the at least one lens is changed from a first location to a second location, change a size of a second image frame, which has a second viewing angle larger than a first viewing angle of a first image frame generated at the first location, among frames in an image generated using the image sensor, to a size corresponding to the first viewing angle,
     calculate a focus direction vector using the first viewing angle and the second viewing angle, and
     change the size of the second image frame based on the calculated focus direction vector.

2. The electronic device of claim 1, wherein the at least one processor is configured to acquire a predetermined correction coefficient corresponding to each location of the at least one lens, and change the size of the second image frame based on the predetermined correction coefficient.

3. The electronic device of claim 2, wherein the at least one processor is configured to generate the predetermined correction coefficient using the location of the at least one lens, and transmit the generated predetermined correction coefficient to a second processor.

4. The electronic device of claim 1, wherein the at least one processor is configured to change the size of the second image frame to constantly maintain the second viewing angle at the first viewing angle.

5. The electronic device of claim 4, wherein the first location of the at least one lens is where the at least one lens is spaced from the image sensor by a predetermined threshold distance.

6. The electronic device of claim 1, wherein the at least one processor is configured to apply a shake correction to the second image frame based on the calculated focus direction vector.

7. The electronic device of claim 6, further comprising a display, wherein the at least one processor is configured to display the image on the display in a state where a change in viewing angles between the first and second image frames has been removed.

8. The electronic device of claim 1, further comprising a display, wherein the at least one processor is configured to display the image on the display while maintaining, as the first viewing angle, the viewing angle of the first image frame, which has the first viewing angle, and the viewing angle of the second image frame, the size of which has been changed to the size corresponding to the first viewing angle.

9. The electronic device of claim 1, wherein the at least one processor is configured to downsize a resolution of the image to a resolution of the image sensor.

10. A method for controlling an electronic device, the method comprising:
    executing an auto-focusing mode;
    in response to executing of the auto-focusing mode, identifying a location of at least one lens;
    when the location of the at least one lens is changed from a first location to a second location, changing a size of a second image frame, which has a second viewing angle larger than a first viewing angle of a first image frame generated at the first location, among frames in an image, to a size corresponding to the first viewing angle;
    calculating a focus direction vector using the first viewing angle and the second viewing angle; and
    changing the size of the second image frame based on the calculated focus direction vector.

11. The method of claim 10, further comprising:
    acquiring a predetermined correction coefficient corresponding to each location of the at least one lens; and
    changing the size of the second image frame based on the predetermined correction coefficient.

12. The method of claim 11, further comprising:
generating the predetermined correction coefficient using the location of the at least one lens.

13. The method of claim 10, further comprising:
changing the size of the second image frame to constantly maintain the second viewing angle at the first viewing angle.

14. The method of claim 13, wherein the first location of the at least one lens is where the at least one lens is spaced from an image sensor by a predetermined threshold distance.

15. The method of claim 10, further comprising applying a shake correction to the second image frame based on the calculated focus direction vector.

16. The method of claim 15, further comprising displaying the image in a state where a change in viewing angles between the first and second image frames has been removed.

17. The method of claim 10, further comprising displaying the image while maintaining, as the first viewing angle, the viewing angle of the first image frame, which has the first viewing angle, and the viewing angle of the second image frame, the size of which has been changed to the size corresponding to the first viewing angle.

18. The method of claim 10, further comprising downsizing a resolution of the image to a resolution of an image sensor.

* * * * *